Patented Oct. 11, 1932

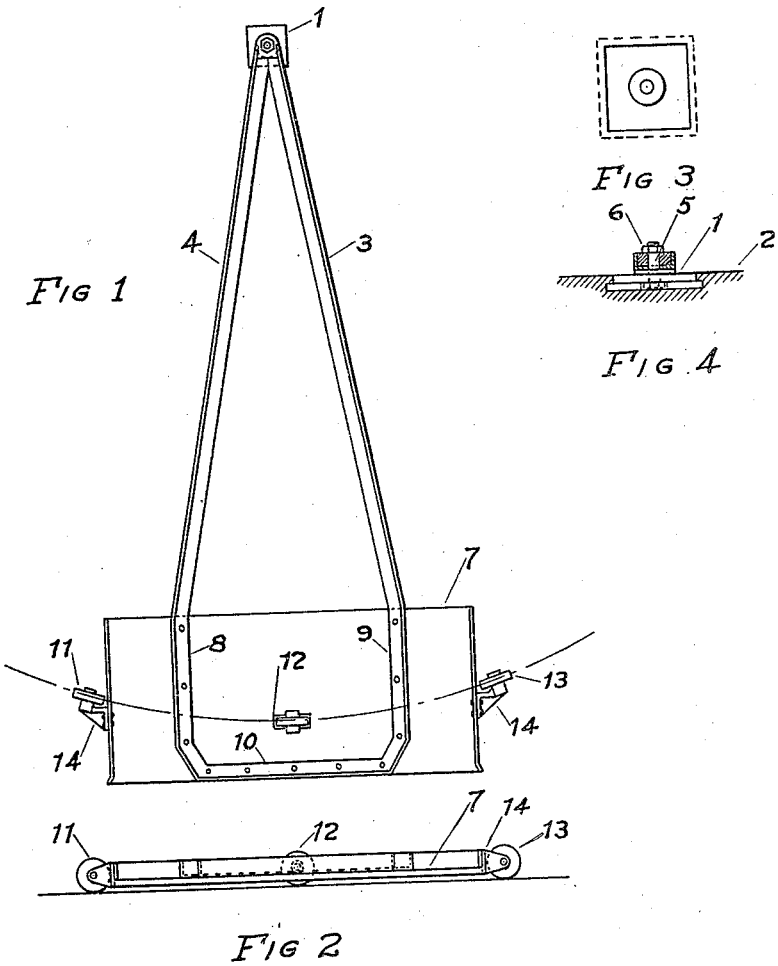

1,882,183

UNITED STATES PATENT OFFICE

REGINALD A. FESSENDEN, OF CHESTNUT HILL, AND HOLMAN K. WHEELER, OF NEWTON, MASSACHUSETTS

MEANS FOR PARKING CARS

Application filed November 1, 1929. Serial No. 404,032.

The present invention relates to means and methods of parking cars, particularly motor vehicles in garages, or in public or private parking spaces.

In the means and method used in the prior art, the parking of cars has been aided by transfer cars, and other devices, some made a part of the motor vehicles. While these devices have been successful to some extent, they have not found a ready general application, some on account of their cost to manufacture and others on account of the difficulty of operation or their failure to meet the necessary requirements.

The device of the present invention may be constructed as an independent car.

In the use of my device, the car has either its front wheels or back wheels run on the device of the invention, and the car then may be turned about 180°. The transfer device in this case may be shorter in length than the car, and may be placed along a wall or at the edge of the aisle in a garage, and be practically out of the way when not in use. It may be used to take the place of a turntable and is far cheaper to manufacture than the turntable or devices of the like kind and purpose.

Without discussing further the merits and objects of the present invention, the invention will be described in detail in connection with the following drawing, in which:

Figure 1 shows a plan view of one form of the invention.

Figure 2, an end view of Figure 1.

Figure 3 a detail and

Figure 4 a section view of the detail shown in Figure 3.

In Figure 1 at the upper end is a block 1, which is set in the ground 2, or concrete of a garage as shown in Figures 3 and 4. In the block is pivoted the ends of the iron or steel beams 3 and 4, which are there joined together, and through which passes the bolt 5 on which is screwed the nut 6. The iron or steel beams at the other end are secured by riveting or otherwise to the platform 7, by the supports 8, 9 and 10.

To the platform 7, there is secured a plurality of small wheels or rollers, 11, 12 and 13, by any suitable means as by the brackets 14, which rollers are respectively set perpendicular to the line connecting the respective roller to the center pivot. The wheels will, when turned, run therefore easily on the arc marked, with the junction of the beams 3 and 4 as the center.

The transfer device shown in Figure 1, besides being used to turn cars about, can also be used as an aid in parking.

The transfer car may first be turned out at an angle. The motor vehicle is then backed up in the same line as the transfer device until the front wheels of the motor vehicle rest on the platform 7. The motor vehicle may then be rotated in place with the rear wheels as a pivot.

Having now described our invention, we claim:

1. A device to aid in the parking of cars, comprising a frame having a fixed pivot, rolling means attached to said frame for allowing said device to wheel in an arc and means provided on said frame, only large enough to receive the front or rear wheels of a motor vehicle.

2. A device to aid in the parking of cars, comprising a frame composed of a triangular shaped support, having a pivot at the smaller angle of the triangle and a platform adjoining the side opposite the pivot sufficiently large to accommodate one set of wheels of a motor vehicle, means for fixing said pivot in position, and means located beneath the platform to allow said platform to turn.

3. A device to aid in the parking of cars, comprising means having a fixed pivot at one end and a rotating sector at the other end, said sector being sufficiently large to accommodate one set of wheels of a motor vehicle.

REGINALD A. FESSENDEN.
HOLMAN K. WHEELER.